United States Patent
Kolatschek et al.

(10) Patent No.: US 9,908,494 B2
(45) Date of Patent: Mar. 6, 2018

(54) METHOD FOR ACTIVATING A PERSONAL PROTECTION DEVICE FOR A MOTORCYCLE AND PERSONAL PROTECTION SYSTEM

(71) Applicant: Robert Bosch GmbH, Stuttgart (DE)

(72) Inventors: Josef Kolatschek, Weil der Stadt (DE); Torsten Maka, Stuttgart (DE); Marielle Cuvillier, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/912,192

(22) PCT Filed: Aug. 22, 2014

(86) PCT No.: PCT/EP2014/067922
§ 371 (c)(1),
(2) Date: Feb. 16, 2016

(87) PCT Pub. No.: WO2015/025040
PCT Pub. Date: Feb. 26, 2015

(65) Prior Publication Data
US 2016/0200274 A1 Jul. 14, 2016

(30) Foreign Application Priority Data
Aug. 22, 2013 (DE) .......... 10 2013 216 711

(51) Int. Cl.
*B60R 21/0134* (2006.01)
*B62J 27/00* (2006.01)
(Continued)

(52) U.S. Cl.
CPC .......... *B60R 21/0134* (2013.01); *B62J 27/00* (2013.01); *B60R 2021/003* (2013.01);
(Continued)

(58) Field of Classification Search
CPC .............. B62J 2099/0013; B62J 27/00; B60R 2021/0004; B60R 2021/003;
(Continued)

(56) References Cited

U.S. PATENT DOCUMENTS 7,275,762 B2 * 10/2007 Miyata .................... B60R 21/16
280/730.1
7,566,070 B2 * 7/2009 Miyata .................. B60R 21/233
180/219
(Continued)

FOREIGN PATENT DOCUMENTS

CN 1537752 A 10/2004
DE 197 29 627 1/1998
(Continued)

OTHER PUBLICATIONS

International Search Report for PCT/EP2014/067922, dated Oct. 23, 2014.

*Primary Examiner* — Tyler J Lee
(74) *Attorney, Agent, or Firm* — Norton Rose Fulbright US LLP; Gerard Messina

(57) ABSTRACT

In a method for activating a personal protection device for a motorcycle, which personal protection device has at least one airbag that is capable of being deployed in a region facing away from a driver of the motorcycle, in front of a front fork and/or in front of a front windshield and/or in front of a front headlight of the motorcycle, a collision signal is read in that represents a collision or an impending collision of the motorcycle, and subsequently an activation signal is provided, using the collision signal, in order to activate the personal protection device and deploy the at least one airbag.

14 Claims, 2 Drawing Sheets

(51) Int. Cl.
*B60R 21/00* (2006.01)
*B60R 21/01* (2006.01)
*B62J 99/00* (2009.01)

(52) U.S. Cl.
CPC ............. *B60R 2021/0004* (2013.01); *B60R 2021/0088* (2013.01); *B60R 2021/01013* (2013.01); *B60R 2021/01286* (2013.01); *B62J 2099/0013* (2013.01)

(58) Field of Classification Search
CPC .. B60R 2021/0088; B60R 2021/01013; B60R 2021/01286; B60R 21/0134
USPC .......................................................... 701/45
See application file for complete search history.

(56) References Cited

U.S. PATENT DOCUMENTS

| | | | | |
|---|---|---|---|---|
| 7,568,731 | B2* | 8/2009 | Miyata | B60R 21/16 280/728.2 |
| 7,766,374 | B2* | 8/2010 | Abele | B60R 21/206 280/730.1 |
| 7,793,976 | B2* | 9/2010 | Kuroe | B60R 21/231 280/730.1 |
| 7,882,921 | B2* | 2/2011 | Hakki | B60R 19/205 180/271 |
| 8,690,186 | B2* | 4/2014 | Kuroki | B60R 21/231 280/728.2 |
| 2003/0189323 | A1* | 10/2003 | Akiyama | B60R 21/231 280/729 |
| 2003/0214122 | A1* | 11/2003 | Miyata | B62J 27/00 280/730.1 |
| 2004/0051281 | A1* | 3/2004 | Miyata | B62J 27/00 280/730.1 |
| 2007/0063492 | A1* | 3/2007 | Igawa | B60R 21/235 280/730.1 |
| 2007/0170703 | A1* | 7/2007 | Miyata | B60R 21/2338 280/730.1 |
| 2007/0170704 | A1* | 7/2007 | Miyata | B62J 27/00 280/730.1 |
| 2007/0284857 | A1* | 12/2007 | Miyata | B60R 21/16 280/728.2 |
| 2008/0224456 | A1* | 9/2008 | Kuroe | B60R 21/233 280/730.1 |
| 2008/0309060 | A1* | 12/2008 | Hakki | B60R 19/205 280/770 |
| 2009/0055053 | A1* | 2/2009 | Carmeli | B60R 21/0132 701/45 |
| 2014/0015232 | A1* | 1/2014 | Sugimoto | B62J 27/00 280/728.3 |
| 2014/0015235 | A1* | 1/2014 | Sugimoto | B60R 21/23 280/741 |

FOREIGN PATENT DOCUMENTS

| | | |
|---|---|---|
| DE | 298 07 171 | 9/1999 |
| DE | 299 17 343 | 1/2000 |
| DE | 100 04 307 | 8/2001 |
| DE | 10 2011 082 | 3/2013 |
| EP | 2 305 543 | 4/2011 |

* cited by examiner ated signal using the collision signal
in order to activate the personal protection device in order to
deploy the at least one airbag.

A personal protection device can be understood as a
device installed in a motorcycle that is fashioned to protect
a driver of the motorcycle from injury in particular during a
collision of the motorcycle. In addition or alternatively, the
personal protection device can be fashioned to protect other
motorcycle passengers and/or other traffic participants during the collision. For this purpose, the personal protection
device can for example have one or more airbags that can be
capable of being deployed in different regions of the motorcycle. The personal protection device can have further safety
devices such as belt tighteners that can be activated when
there is an activation of the personal protection device. The
motorcycle can be a motorized two-wheeled vehicle, such as
a motorcycle or a motorized scooter, or a motor trike or quad
motorcycle. An airbag can be understood as a sack that can
be filled with a gas that is fashioned to be deployed upon
activation of the personal protection device. The at least one
airbag can be capable of being deployed in a region facing
away from the driver of the motorcycle, in front of the front
fork and/or in front of a front windshield and/or in front of
a front headlight of the motorcycle, so that the front fork
and/or the front windshield and/or the front headlight is
situated between the at least one airbag and the driver when
the at least one airbag is deployed. A driver can be understood as a person seated on the motorcycle.

The collision signal can be understood as a signal that is
provided by a corresponding sensor, for example an acceleration sensor or image sensor installed in the motorcycle, in
response to an impending collision of the motorcycle. An
activation signal can be understood as a signal that is
provided by a control device that has a corresponding
interface for reading in the collision signal, using the collision signal.

The present approach is based on the recognition that
conventional airbags for motorcycles can be fashioned to
deploy in a region between a driver and a front windshield
of a motorcycle in response to recognition of a danger of a
collision. Using the present approach, the passive safety of
the driver and/or of an additional passenger can be significantly increased by deploying the airbag, in response to the
recognition of the danger of collision, in a region in front of
the front windshield and/or in front of a front fork and/or in
front of a front headlight. This has the advantage that in
order to absorb collision energy the airbag can be supported
on an object collided with. In addition, in this way a lifting
up of a rear wheel of the motorcycle can be counteracted. In
order to recognize the danger of collision, a collision signal
can be read in. Using the collision signal, an activation
signal can then be provided for activating a personal protection device that is fashioned to deploy the airbag upon
activation. Using the present approach, an existing personal
protection system can be usefully expanded and improved
using simple technical auxiliary means that can be provided
at low cost.

Also advantageous is a computer program product having
program code that can be stored on a machine-readable
carrier such as a semiconductor memory, a hard drive
memory, or an optical memory, and that is used to carry out
the method according to the specific embodiment described
above when the program product is executed on a computer
or on a device.

The present approach also provides an activation device
for activating a personal protection device for a motorcycle.
Here, the personal protection device has at least one airbag

METHOD FOR ACTIVATING A PERSONAL PROTECTION DEVICE FOR A MOTORCYCLE AND PERSONAL PROTECTION SYSTEM

BACKGROUND OF THE INVENTION

1. Field of the Invention

The present invention relates to a method and to an
activation device for activating a personal protection device
for a motorcycle, to a corresponding computer program
product, to a personal protection system, to a motorcycle
having a personal protection system, and to a method for
producing a motorcycle having a personal protection device.

2. Description of the Related Art

Motorcycles are by far the most dangerous motorized
mode of transportation. This is clear from a comparison of
the accident statistics for motorized two-wheeled vehicles
and automobiles. Thus, the GIDAS (German In-Depth Accident Study) database indicates that for motorcyclists the risk
of suffering a severe or fatal accident is about 16 times
greater than it is for automobile occupants. This is due, inter
alia, to the different driving physics and the constantly labile
state of equilibrium, and to the particular physical and
mental stress placed on motorcyclists. In addition, motorcycles do not have a protective body structure. In collisions
or crashes, motorcyclists are unprotected traffic participants,
despite protective clothing.

Although in recent years great progress has been made in
the area of passive safety in passenger cars, in particular
through the introduction of airbags, until now motorcyclists
have seen little benefit from these developments. This is due
not least to the ongoing lack of prevalence of passive safety
systems in motorcycles. Passive safety systems for motorized two-wheeled vehicles are largely limited to personal
protective equipment of the rider, such as helmet or clothing,
and passive constructive elements on the motorcycle, such
as safety bars. Systems such as airbags or safety belts having
belt tighteners, long part of the minimal equipment in
passenger cars, are still not universally standard series
production equipment in motorcycles.

Published German patent application document DE 197
29 627 A1 describes a conventional safety system for a
motorcycle. This is the only airbag system for motorcycles
obtainable in current production.

All conventional systems have in common that they are
situated between the passenger and the front windshield of
the vehicle, and that the airbag is deployed from the tank or
from a module situated behind the front windshield.

BRIEF SUMMARY OF THE INVENTION

Against this background, the present invention provides a
method and an activation device for activating a personal
protection device for a motorcycle, a corresponding computer program product, a personal protection system, a
motorcycle having a personal protection system, and a
method for producing such a motorcycle.

A method is presented for activating a personal protection
device for a motorcycle. Here, the personal protection
device has at least one airbag that can be deployed in a
region that faces away from a driver of the motorcycle, in
front of a front fork and/or in front of a front windshield
and/or in front of a front headlight of the motorcycle. The
method includes the following steps:

reading in of a collision signal, the collision signal representing an impending collision of the motorcycle; and that is capable of being deployed in a region facing away from the driver of the motorcycle in front of a front fork and/or in front of a front windshield and/or in front of a front headlight of the motorcycle. The activation device has the following features:

a read-in unit for reading in a collision signal, the collision signal representing an impending collision of the motorcycle; and a provision unit for providing an activation signal using the collision signal in order to activate the personal protection device in order to deploy the at least one airbag.

An activation device can be understood in the present context as an electrical apparatus that processes sensor signals and, as a function thereof, outputs control signals and/or data signals. The device can have an interface that can be realized as hardware and/or as software. In the case of a hardware realization, the interfaces can for example be part of a so-called system ASIC that contains a wide variety of functions of the device. However, it is also possible for the interfaces to be separate integrated circuits, or to be made up at least partly of discrete components. In the case of a realization as software, the interfaces can be software modules present for example on a microcontroller alongside other software modules. Through these variant embodiments of the present approach, the object underlying the present approach can be achieved rapidly and efficiently.

In addition, the present approach provides a personal protection system having the following features:

a personal protection device for a motorcycle, the personal protection device having at least one airbag that is capable of being deployed in a region facing away from a driver of the motorcycle, in front of the front fork and/or in front of a front windshield and/or in front of a front headlight of the motorcycle; and an activation device according to a specific embodiment described above in order to activate the personal protection device in order to deploy the at least one airbag.

A personal protection system can be understood as a system integrated in the motorcycle for protecting the driver and/or the passenger and/or other traffic participants from injuries during a collision. The personal protection system can have the personal protection device and the activation device. In addition, the personal protection system can include a plurality of additional personal protection devices that are fashioned to be activated by the activation device. Through the personal protection system, the safety of the driver and/or of the passenger and/or of other traffic participants can be significantly increased.

According to a specific embodiment of the present approach, a major portion of an impact surface of the at least one airbag can be oriented toward a main direction of travel of the motorcycle when the at least one airbag is deployed. A main direction of travel can be understood as a direction of travel of the motorcycle in which the motorcycle travels when it is moved forward. An impact surface can be understood as a surface of the at least one airbag that is fashioned to absorb an impact energy of an impact of the motorcycle against an object. For example, the impact surface can be significantly larger than a front surface of the motorcycle. In this way, the impact can be efficiently damped.

According to a specific embodiment of the present approach, a predetermined portion of a surface of the at least one airbag can be oriented toward the driver of the motorcycle when the at least one airbag is deployed. For example, the predetermined portion can be 20%, 30%, or 40% of the surface of the at least one airbag. The at least one airbag can for example be capable of being deployed in such a way that when there is a collision the driver of the motorcycle meets the predetermined portion of the surface. In this way, a forward acceleration of the driver can for example be prevented. Because the at least one airbag in addition fulfills the function of a driver airbag, a costly installation of an additional driver airbag can be done without.

The present approach further provides a motorcycle having a personal protection system according to one of the specific embodiments described above.

According to a specific embodiment of the present approach, the main portion of the impact surface of the at least one airbag can be situated above a center of gravity of the motorcycle when the at least one airbag is deployed. A lifting up of a rear wheel of the motorcycle can be counteracted due to the fact that during the collision the at least one airbag can be supported on the object, by the impact surface, above a center of gravity of the motorcycle.

According to a specific embodiment of the present approach, the at least one airbag can be attached to a frame element of the motorcycle. A frame element can be understood as an element of a bearing chassis of the motorcycle. For example drive elements, steering elements, energy storage elements, seats, and cover parts of the motorcycle can be attached to the chassis. The raising up of the rear wheel can be counteracted with a particularly strong force due to the fact that the impact energy is introduced into the frame element via the impact surface of the at least one airbag.

According to a specific embodiment of the present approach, the at least one airbag can be integrated in a front cover plate of the motorcycle. A front cover plate can be understood as a cover plate of a chassis of the motorcycle fashioned in a front area of the motorcycle. In this specific embodiment, the at least one airbag can be realized in a manner that is particularly space-saving and cost-saving.

Finally, the present approach creates a method for manufacturing a motorcycle having a personal protection device for a motorcycle. Here, the personal protection device has at least one airbag that is capable of being deployed in the region facing away from a driver of the motorcycle, in front of a front fork and/or in front of a front windshield and/or in front of a front headlight of the motorcycle. The method includes a step of manufacture of the motorcycle. Here, the manufacture of the motorcycle takes place in such a way that the at least one airbag is capable of being deployed in the region in front of the front fork and/or in front of the front windshield and/or in front of the front headlight of the motorcycle.

In the following, the present invention is explained in more detail in relation to examples on the basis of the accompanying drawings.

DETAILED DESCRIPTION OF THE DRAWINGS

Figure 1:
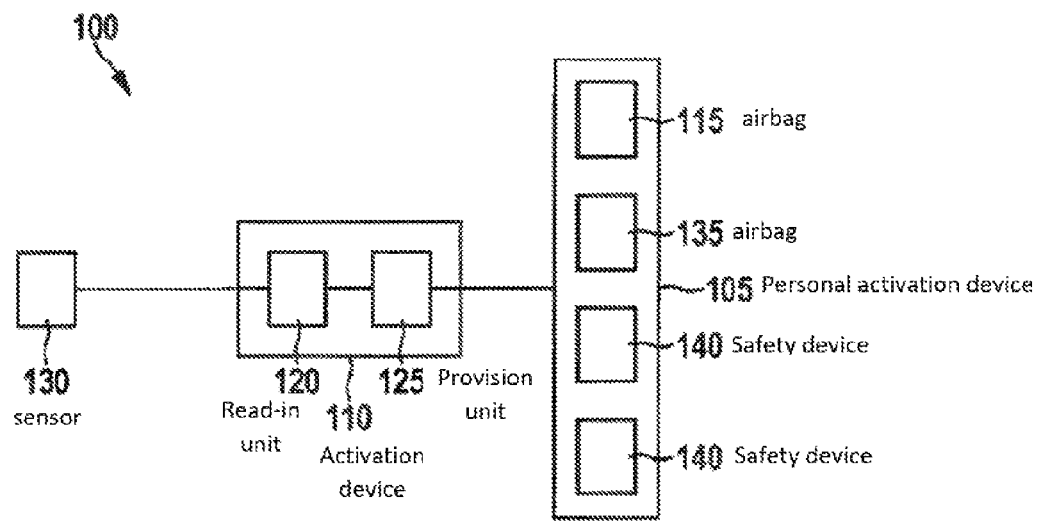
FIG. 1 shows a schematic diagram of a personal protection system according to an exemplary embodiment of the present invention.

In the following description of advantageous exemplary embodiments of the present invention, identical or similar reference characters are used for the elements shown in the various Figures and having similar function, and repeated description of these elements is omitted.

FIG. 1 shows a schematic diagram of a personal protection system 100 according to an exemplary embodiment of the present invention. Personal protection system 100 has a personal protection device 105 for a motorcycle (not shown in FIG. 1) and an activation device 110. Personal protection device 105 has an airbag 115. Airbag 115 is fashioned to be deployed in a region facing away from a driver of the motorcycle, in front of a front fork and/or in front of a front windshield and/or in front of a front headlight of the motorcycle. Activation device 110 has a read-in unit 120 and a provision unit 125. Read-in unit 120 is connected to provision unit 125. Read-in unit 120 is fashioned to read in a collision signal. The collision signal here represents an impending collision of the motorcycle. In addition, read-in unit 120 is fashioned to output the collision signal to provision unit 125. Provision unit 125 is fashioned to receive the collision signal and, using the collision signal, to provide an activation signal. Provision unit 125 is connected to personal protection device 105 via an interface of activation device 110. Personal protection device 105 is fashioned to receive the activation signal and to be activated in response to the reception of the activation signal. During this, airbag 115 is deployed.

According to this exemplary embodiment, the collision signal is provided by a sensor 130 connected to read-in unit 120 via a further interface of activation device 110. Sensor 130 is for example realized as an acceleration sensor for acquiring the deceleration of the motorcycle caused by the crash, or as a camera for acquiring a surrounding environment of the motorcycle.

In addition, personal protection device 105 has an example a driver airbag 135 situated adjacent to a driver of the motorcycle, and two further safety devices 140, such as a passenger airbag or a belt tightener. Personal protection device 105 is fashioned in this exemplary embodiment to activate, in addition to airbag 115, driver airbag 135 and additional safety devices 140, in response to the reception of the activation signal.

Figure 2:
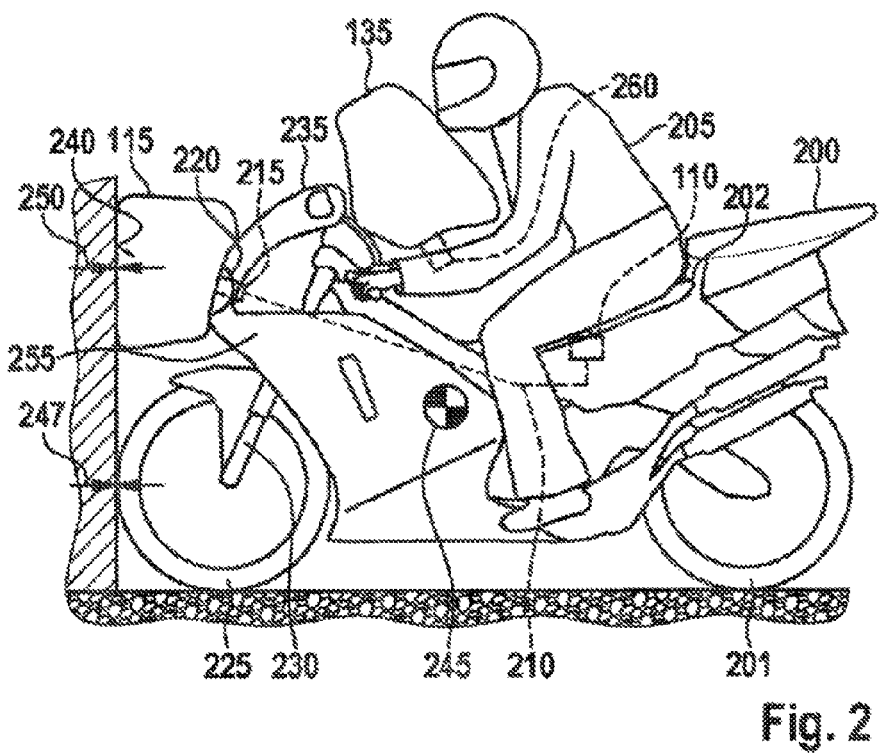
FIG. 2 shows a schematic representation of a motorcycle having a personal protection system according to a specific embodiment of the present invention.

FIG. 2 shows a schematic representation of a motorcycle 200 having a personal protection system according to an exemplary embodiment of the present invention. FIG. 2 shows a frontal impact of motorcycle 200 against a wall. The wall is situated perpendicular to a flat travel route of motorcycle 200. Here, motorcycle 200 is in an approximately horizontal position. A driver 205 is situated on a driver's seat 202 of motorcycle 200.

The personal protection system has activation device 110 shown in FIG. 1, as well as a personal protection device having airbags 115, 135 shown in FIG. 1. Airbags 115, 135 are each shown in a deployed state. Activation device 110 is situated underneath driver's seat 202, and is connected to airbag 115 via a data connection 210, shown here as a cable as an example. An airbag housing 215 of airbag 115 is situated adjacent to a front headlight 220 of motorcycle 200. Front headlight 220 is situated between the wall and a front fork 230 of motorcycle 200. In addition, a front windshield 235 is situated between front fork 230 and front headlight 220. Airbag 115 is fixedly connected to airbag housing 215. Airbag housing 215 is fashioned to provide airbag 115 in a folded state, and to fill it with a gas in response to the activation of the personal protection device, so that in its deployed state airbag 115 is situated between the wall and front headlight 220, and above a front wheel 225 of motorcycle 200.

According to this exemplary embodiment, airbag 115 is provided with an impact surface 240 that is oriented in a main direction of travel of motorcycle 200. In FIG. 2, impacts surface 240 points in the direction of the wall. In addition, impact surface 240 is configured approximately perpendicular to a longitudinal axis of motorcycle 200. Impact surface 240 has for example no curvature, or only a slight curvature.

In addition, impact surface 240 is situated above a center of gravity 245 of motorcycle 200. In FIG. 2, center of gravity 245 is shown as an example in a region of motorcycle 200 adjacent to a knee of driver 205.

When motorcycle 200 makes impact, a region of front wheel 225 situated at the height of a hub of front wheel 225 makes contact with the wall. This point of contact forms a lower load path 247 via which an impact energy of the impact is transmitted at least partially to motorcycle 200. Lower load path 247 is represented by two arrows pointing counter to one another.

In addition, a main portion of impact surface 240 makes contact with the wall. Here, the main portion corresponds, as an example, to a total surface of impact surface 240. Via impact surface 240, airbag 115 is supported on the wall over a large surface. Here, airbag 115 forms an upper load path 250 via which the impact energy is transmitted to motorcycle 200, in addition to lower load path 247, in such a way that upon impact rear wheel 201 lifts off from the roadway only slightly. Upper load path 250 is also represented by two arrows pointing counter to one another. In order to better absorb the impact energy, airbag 115 is fixedly connected, via airbag housing 215, to a frame element 255 of motorcycle 200. Frame element 255 is fashioned to bear a main portion of a weight of the motorcycle. Frame element 255 is shown schematically in FIG. 2 by broken lines.

Driver airbag 135 is situated, as an example, above a tank of motorcycle 200, between driver 205 and front fork 230. A driver airbag housing 260 of driver airbag 135 is integrated into the tank. Driver airbag 135 is fashioned to brake a forward movement of driver 205 caused by the impact.

Figure 3:
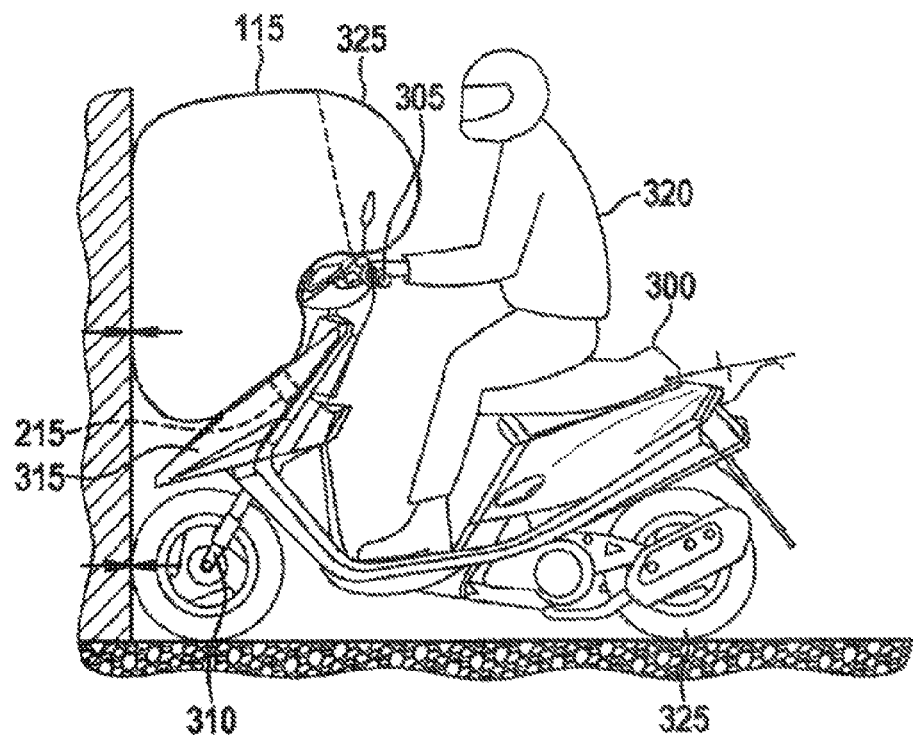
FIG. 3 shows a schematic representation of a motorized scooter having a personal protection system according to an exemplary embodiment of the present invention.

FIG. 3 shows a schematic representation of a motorized scooter 300 having a personal protection system according to an exemplary embodiment of the present invention. Differing from motorcycle 200 shown in FIG. 2, motorized scooter 300 has no driver airbag and no front windshield. Airbag 115 has a significantly larger volume than in FIG. 2. For example, the volume is twice or three times as large as in FIG. 2. Airbag housing 215 is attached immediately below a steering element 305 of motorized scooter 300, and in front of a front fork 310 of the scooter. Scooter 300 has in addition a front cover plate 315, such as a plastic or metal plate, that surrounds a front frame region, facing the main direction of travel, of scooter 300. Airbag 115 and airbag housing 215 are integrated into front cover plate 315.

According to this exemplary embodiment, airbag 115 extends horizontally from steering element 305 up to the wall, and vertically from a front protective plate of scooter 300 up to a head region of a driver 320 of scooter 300. Here, driver 320 is seated upright on scooter 300. Similar to motorcycle 200 shown in FIG. 2, scooter 300 is stabilized by airbag 115 in such a way that a rear wheel 325 of scooter 300 does not lift off from the roadway, or does so only slightly, in the impact shown here.

A predetermined portion 325 of a surface of airbag 115 is oriented toward driver 320. Predetermined portion 325 extends for example over a region above steering element 305. Predetermined portion 325 is fashioned to support the head of driver 320 if driver 320 is accelerated forward during an impact. Thus, airbag 115 shown in FIG. 3 takes over the function of driver airbag 135 shown in FIG. 2.

It is also conceivable for airbag 115 to be divided into two chambers through suitable constructive measures, so that the pressure in the part facing the driver ("driver airbag part") is different than it is in the part facing the wall ("up-front airbag part"). The aim of this is to optimize the forces occurring during the crash in such a way that both the vehicle and the driver are optimally decelerated.

In the following, an exemplary embodiment of the present invention is described in summary fashion again on the basis of FIGS. 1 through 3.

An airbag system 100 for a motorized two-wheel vehicle 200, 300 is fashioned to deploy an airbag 115 in front of a front windshield 235, a front fork 230, 310, and/or above a front wheel 225 of two-wheeled vehicle 200, 300. Airbag system 100 can also be designated personal protection system 100 or system 100. Two-wheeled vehicle 200, 300 can also be designated vehicle 200, 300, motorcycle 200, 300, motorcycle 200, or motorized scooter 300. In addition, airbag 115 can also be referred to as up-front airbag 115, front airbag 115, or bag 115. Airbag 115 is for example deployed from a module 215 integrated into a front structure of two-wheeled vehicle 200, 300. Module 215 can also be designated airbag housing 215 or housing 215.

Using system 100, the passive safety of a rider can be increased, in particular in a front crash. In addition, system 100 is also suitable for small vehicles such as the motorized scooter 300 shown in FIG. 3, in which it is not possible to situate module 215 in the area of a tank or instrument panel. Finally, using system 100 a lifting off of a rear wheel 201, 325 in a front crash can be reduced, because vehicle 200, 300 can be supported with airbag 115 against an object collided with over a large surface already in an early crash phase.

Analogous to known motorcycle airbag systems, the proposed airbag system 100 is made up of an airbag control device 110 (also called activation device 110). If warranted, airbag system 100 may also have a look-ahead sensor system (also called sensor 130) that is fashioned to continuously monitor the driving state of two-wheeled vehicle 200, 300 and to trigger restraint means as needed. In addition, airbag system 100 has airbag 115 that, in contrast to the known systems, is situated in the front structure of the motorcycle and is supported on a bearing frame part 255 (also called frame element 255).

FIG. 1 shows a basic system architecture corresponding to the existing art. The proposed up-front airbag 115 is combined with further passive safety systems, in particular restraint systems such as safety belt systems or additional airbags. In FIG. 1, the additional systems are shown as examples as driver airbag 135 and additional safety devices 140.

Up-front airbag 115 reduces a lifting up of vehicle 200, 300 during frontal impact against an obstacle, because a contact point of vehicle 200, 300, normally a front wheel, with an accident counterpart is situated below a center of gravity of vehicle 200, 300. Due to the occurring forces, during the impact a torque is induced that causes the rear of the vehicle to lift up. As shown in FIG. 2, up-front airbag 115 is supported, above center of gravity 245, on the object collided with over a large surface, and in this way reduces the lifting up. Up-front airbag 115 thus acts as a crash box.

The lifting up of vehicle 200, 300 occurs in particular in combination with a belt system, and absolutely must be prevented, because the head of the rider moves toward the object collided with, so that the risk of injury increases.

Several functional variants of system 100 are conceivable. According to a first variant, up-front airbag 115 is fashioned to absorb energy and in this way to reduce a force impact acting on the rider. According to a second variant, up-front airbag 115 is fashioned to take over the function of a crash box and to reduce the lifting up of the vehicle. According to a third variant, up-front airbag 115 is fashioned to take over the function of a crash box and at the same time the function of a classical motorcycle airbag such as driver airbag 135 shown in FIGS. 1 and 2, which restrains the rider.

FIG. 2 schematically shows the system. Up-front airbag 115 is integrated in the front structure of vehicle 200. When a front crash is recognized, up-front airbag 115 is activated. Here, up-front airbag 115 is deployed for example forward. In addition, housing 215 is connected to bearing frame part 255, so that during contact with an obstacle, at the one side airbag 115 can be supported on the obstacle over a large surface, and at the other side a contact force can be reliably introduced into a frame of vehicle 200. Through this second load path 250, a lifting up of vehicle 200 is reduced.

In addition, a defined force level in upper load path 250 can be set via a characteristic of airbag 115. This results in an improved dismantling of energy, analogous to a crush zone of an automobile. In combination with other restraint systems, such as a belt system for the rider or an additional airbag, in this way the force acting on the rider can be suitably modeled in order to reduce the risk of injury. If no other restraint system is present, up-front airbag 115 can be realized such that after a certain degree of forward displacement the rider meets bag 115. In this way, a direct contact, for example with a vehicle collided with, is avoided.

FIG. 2 shows an example of a combination with a classical tank airbag 135 (also called driver airbag 135), fashioned to restrain the rider in the case of a crash. However, other combinations with passive safety systems are also conceivable. The system shown in FIG. 2 is primarily suitable for larger vehicles as a supplement to known safety systems.

In contrast, the system shown in FIG. 3 is particularly suitable for smaller vehicles such as scooters. Up-front airbag 115 here not only takes over the role of a classical driver airbag, but optionally also takes over the role of the described crash box. It prevents on the one hand a lifting up of vehicle 300, and on the other hand restrains driver 320. The system is to be housed in a front cover panel 315, and is thus also suitable for vehicles in which, due to particular design details, no suitable space for an airbag can be found at another location such as a seat, tank, or instrument panel. In addition, the system is lower in cost than a two-airbag solution.

Figure 4:
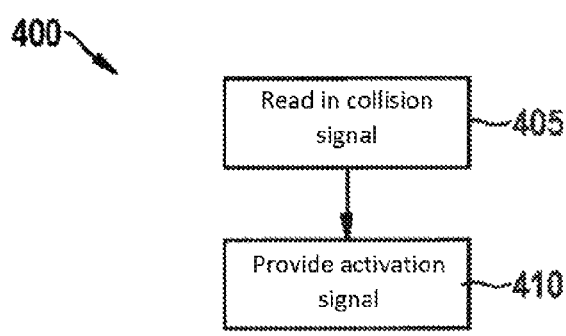
FIG. 4 shows a flow diagram of a method for activating a personal protection device for a motorcycle according to an exemplary embodiment of the present invention.

FIG. 4 shows a flow diagram of a method 400 for activating a personal protection device for a motorcycle according to an exemplary embodiment of the present invention. Here, the personal protection device has at least one airbag that is capable of being deployed in a region facing away from a driver of the motorcycle, in front of a front fork and/or in front of a front windshield and/or in front of a front headlight of the motorcycle. First, in a step 405, there takes place the reading in of a collision signal. Here, the collision signal represents a collision of the motorcycle that is impending or that is currently taking place. In a further step 410, an activation signal is provided using the collision signal, in order to activate the personal protection device. Here, the at least one airbag is deployed. The personal protection device can be the personal protection device shown in the preceding Figures.

Figure 5:
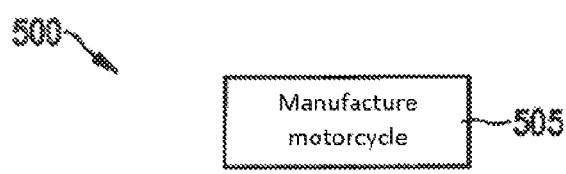
FIG. 5 shows a flow diagram of a method for producing a motorcycle having a personal protection device for a motorcycle according to an exemplary embodiment of the present invention.

FIG. 5 shows a flow diagram of a method 500 for manufacturing a motorcycle having a personal protection device for a motorcycle according to an exemplary embodiment of the present invention. The personal protection device here has at least one airbag that is capable of being deployed in a region facing away from a driver of the motorcycle, in front of a front fork and/or in front of a front windshield and/or in front of a front headlight of the motorcycle. In a step 505, the motorcycle is manufactured. Here, the manufacturing of the motorcycle takes place in such a way that the at least one airbag is capable of being deployed in the region in front of the front fork and/or in front of the front windshield and/or in front of the front headlight of the motorcycle.

The method 500 can be used to manufacture a motorcycle as shown in the preceding Figures.

The exemplary embodiments described and shown in the Figures have been selected only as examples. Different exemplary embodiments can be combined with one another in their entirety or with regard to individual features. An exemplary embodiment can also be supplemented by features of another exemplary embodiment.

In addition, method steps according to the present invention can be repeated, and can be executed in a sequence differing from that described.

If an exemplary embodiment has an "and/or" linkage between a first feature and a second feature, this is to be read as meaning that according to a specific embodiment the exemplary embodiment has both the first feature and the second feature, and according to another specific embodiment the exemplary embodiment has either only the first feature or only the second feature.

What is claimed is:

1. A method for activating a personal protection device of a motorcycle, the personal protection device including at least one airbag, the method comprising:
   reading in a collision signal representing at least one of a collision of the motorcycle which has occurred and an impending collision of the motorcycle; and
   providing an activation signal, as a function of the collision signal, in order to activate the personal protection device in order to deploy the at least one airbag;
   wherein the at least one air bag:
      is configured to be deployed in a region that is forward of at least one of a front fork from which two branches extend at respective sides of a front wheel, a front windshield, and a front headlight;
      in its inflated state includes (1) a first inflated section that is rearward of, and at a vertical coordinate that is higher than, a manually operable steering component of the motorcycle and (2) a second inflated section (a) in which a pressure differs from a pressure in the first inflated section and (b) that is in the region that is forward of the at least one of the front fork, front windshield, and front headlight; and
      is configured so that, during inflation of the at least one airbag, the at least one airbag inflates in a rearward direction to produce the first inflated section after the second inflated section has already been provided.

2. A non-transitory, computer-readable data storage medium storing a computer program having program codes which, when executed on a computer, cause the computer to perform a method for activating a personal protection device of a motorcycle, the personal protection device including at least one airbag, the method comprising:
   reading in a collision signal representing at least one of a collision of the motorcycle which has occurred and an impending collision of the motorcycle; and
   providing an activation signal, as a function of the collision signal, in order to activate the personal protection device in order to deploy the at least one airbag;
   wherein the at least one air bag:
      is configured to be deployed in a region that is forward of at least one of a front fork from which two branches extend at respective sides of a front wheel, a front windshield, and a front headlight;
      in its inflated state includes (1) a first inflated section that is rearward of, and at a vertical coordinate that is higher than, a manually operable steering component of the motorcycle and (2) a second inflated section (a) in which a pressure differs from a pressure in the first inflated section and (b) that is in the region that is forward of the at least one of the front fork, front windshield, and front headlight; and
      is configured so that, during inflation of the at least one airbag, the at least one airbag inflates in a rearward direction to produce the first inflated section after the second section has already been provided.

3. An activation device for activating a personal protection device of a motorcycle, the personal protection device including at least one airbag, the activation device comprising:
   at least one interface; and
   processing circuitry;
   wherein:
      the processing circuitry is configured to read in, via the at least one interface, a collision signal representing at least one of a collision of the motorcycle which has occurred and an impending collision of the motorcycle and generate, as a function of the collision signal, and provide, via the at least one interface, an activation signal in order to activate the personal protection device in order to deploy the at least one airbag; and
      the at least one air bag:
         is configured to be deployed in a region that is forward of at least one of a front fork from which two branches extend at respective sides of a front wheel, a front windshield, and a front headlight;
         in its inflated state includes (1) a first inflated section that is rearward of, and at a vertical coordinate that is higher than, a manually operable steering component of the motorcycle and (2) a second inflated section (a) in which a pressure differs from a pressure in the first inflated section and (b) that is in the region that is forward of the at least one of the front fork, front windshield, and front headlight; and
         is configured so that, during inflation of the at least one airbag, the at least one airbag inflates in a rearward direction to produce the first inflated section after the second section has already been provided.

4. The activation device as recited in claim 3, wherein a single airbag includes both the first inflated section and the second inflated section.

5. The activation device as recited in claim 4, wherein, during inflation of the single airbag and after the second inflated section is provided, the single airbag inflates in the rearward direction to produce the first inflated section.

6. The activation device as recited in claim 3, wherein, upon deployment of the at least one airbag and with respect to the direction extending between front and rear ends of the motorcycle, the single airbag first inflates towards the front end of the motorcycle and away from a driver seat of the motorcycle and subsequently continues its inflation towards the rear end of the motorcycle.

7. The activation device as recited in claim 6, wherein a single airbag includes both the first inflated section and the second inflated section.

8. The activation device as recited in claim 3, wherein, with respect to a direction extending between front and rear ends of the motorcycle, the at least one airbag is positioned in its deflated state at a same position as, or forward of, the at least one of the front fork, front windshield, and front headlight.

9. A personal protection system for a motorcycle, comprising:
- a personal protection device for a motorcycle, the personal protection device including at least one airbag; and
- an activation device for activating the personal protection device, the activation device including at least one interface and processing circuitry;

wherein:
- the processing circuitry is configured to read in, via the at least one interface, a collision signal representing at least one of a collision of the motorcycle which has occurred and an impending collision of the motorcycle and generate, as a function of the collision signal, and provide, via the at least one interface, an activation signal in order to activate the personal protection device in order to deploy the at least one airbag; and
- the at least one air bag:
  - is configured to be deployed in a region that is forward of at least one of a front fork from which two branches extend at respective sides of a front wheel, a front windshield, and a front headlight;
  - in its inflated state includes (1) a first inflated section that is rearward of, and at a vertical coordinate that is higher than, a manually operable steering component of the motorcycle and (2) a second inflated section (a) in which a pressure differs from a pressure in the first inflated section and (b) that is in the region that is forward of the at least one of the front fork, front windshield, and front headlight; and
  - is configured so that, during inflation of the at least one airbag, the at least one airbag inflates in a rearward direction to produce the first inflated section after the second section has already been provided.

10. The personal protection system as recited in claim 9, wherein a main portion of an impact surface of the at least one airbag is oriented toward a main direction of travel of the motorcycle when the at least one airbag is deployed.

11. The personal protection system as recited in claim 10, wherein a predetermined portion of a surface of the at least one airbag is oriented toward the driver of the motorcycle when the at least one airbag is deployed.

12. The personal protection system as recited in claim 11, wherein the main portion of the impact surface of the at least one airbag is situated above a center of gravity of the motorcycle when the at least one airbag is deployed.

13. The personal protection system as recited in claim 12, wherein the at least one airbag is attached to a frame element of the motorcycle.

14. The personal protection system as recited in claim 12, wherein the at least one airbag is integrated into a front cover panel of the motorcycle.

\* \* \* \* \*